United States Patent [19]

Juso et al.

[11] Patent Number: 4,727,438

[45] Date of Patent: Feb. 23, 1988

[54] MULTITRACK MAGNETIC RECORDING AND REPRODUCING APPARATUS AND METHOD OF CONTROLLING TRACKING OF MULTITRACK MAGNETIC HEADS

[75] Inventors: Hiromi Juso, Gose; Kengo Sudoh; Yukihiko Haikawa, both of Higashihiroshima, all of Japan

[73] Assignee: Sharp Kabushiki Kaisha, Osaka, Japan

[21] Appl. No.: 745,137

[22] Filed: Jun. 17, 1985

[51] Int. Cl.$^4$ .............................. G11B 5/02; G11B 5/09
[52] U.S. Cl. ...................................... 360/25; 360/75; 360/76; 360/77
[58] Field of Search ..................... 360/25, 26, 76, 77, 360/121, 75

[56] References Cited

U.S. PATENT DOCUMENTS

| | | | |
|---|---|---|---|
| 3,924,268 | 12/1975 | McIntosh et al. | 360/77 X |
| 3,959,820 | 5/1976 | Braun | 360/77 |
| 4,007,493 | 2/1977 | Behr et al. | 360/77 |
| 4,074,328 | 2/1978 | Hardwick | 360/76 X |
| 4,149,148 | 4/1979 | Behr et al. | 360/77 |
| 4,334,252 | 6/1982 | Toriu | 360/75 |
| 4,361,857 | 11/1982 | Sakamoto | 360/77 |
| 4,499,511 | 2/1985 | Sugaya | 360/78 |
| 4,502,082 | 2/1985 | Ragle et al. | 360/76 |
| 4,556,920 | 12/1985 | Maeda et al. | 360/77 |

Primary Examiner—Stuart N. Hecker
Assistant Examiner—Alyssa H. Bowler
Attorney, Agent, or Firm—Birch, Stewart, Kolasch & Birch

[57] ABSTRACT

The preferred embodiment of the present invention hereby offers a unique and extremely useful multi-track magnetic recording and reproducing apparatus including: a data feed-out device comprised of one or two units of data-reproducing head(s) dealing with some of a plurality of data-recording heads; a control circuit controlling the tracking operations of the data-reproducing heads in response to the output of these reproducing heads; and an azimuth control circuit controlling the deviation time of synchronizing signals in response to the outputs of these reproducing heads.

4 Claims, 10 Drawing Figures

FIG. 1
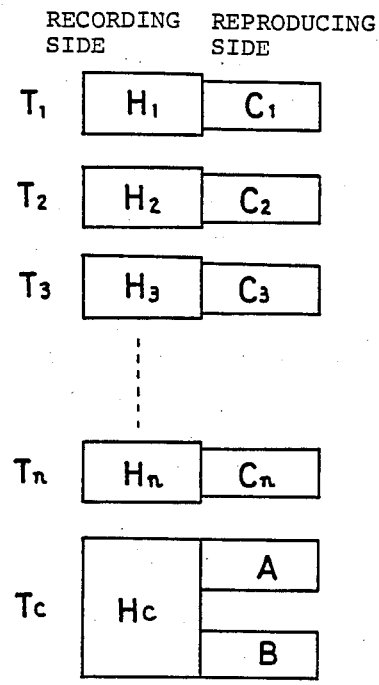
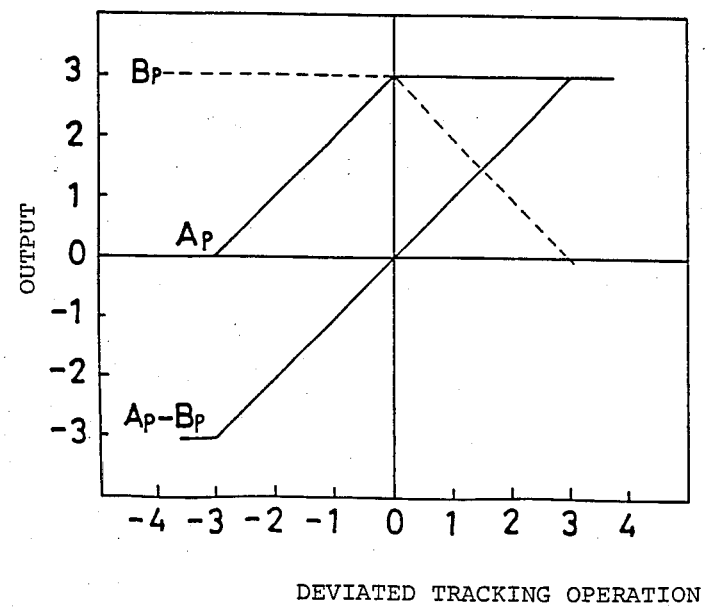
DEVIATED TRACKING OPERATION
FIG. 2

MULTITRACK MAGNETIC RECORDING AND REPRODUCING APPARATUS AND METHOD OF CONTROLLING TRACKING OF MULTITRACK MAGNETIC HEADS

BACKGROUND OF THE INVENTION

The present invention relates to multitrack magnetic recording and reproducing apparatus for recording a variety of information on magnetic tape and reproducing it and also relates to the method of controlling the tracking operation of the multitrack magnetic heads.

Increasing the number of tracks of a conventional multitracking system normally used for recording and reproducing information can improve the fidelity when reproducing the recorded information. However, if such tracks become too dense, the pitches between the tracks become too narrow, thus making it quite difficult to correctly draw out information from individual tracks. The reasons for this are that there is a certain limit to tape-run stability and the relative position of the tape track and the reproducing heads cannot be adequately maintained due to the varying posture of the tape during running. To compensate for this, some systems have introduced a high-precision tape run mechanism for properly regulating tape drift. Nevertheless, such conventional systems still face certain limitations in the realization of complete removal of drift from the running tape. In addition, there is yet another system, the "dynamic tracking control system" that controls the reproducing heads in response to the varying tracking position of these heads during tape run. This system is described below.

FIG. 1 is the typical format of a tracking operation performed by the multi-track magnetic heads of a conventional tracking control system such as is mentioned above. References T1 through Tn respectively indicate the arrangement of magnetic heads dealing with main data tracks containing recorded data on the magnetic tape, such as audio signals, in which the larger rectangles on the left side respectively indicate tracks dealing with the recording magnetic heads and the small rectangles on the right side respectively indicate tracks dealing with the reproducing heads. Reference Tc indicates the arrangement of magnetic heads dealing with the control data track on the magnetic tape, in which the larger rectangles on the left side indicate tracks dealing with the recording magnetic heads and the small rectangles on the right side indicate such tracks dealing with the reproducing heads. As shown in FIG. 1, such a "dynamic tracking control system" is provided with a plurality of magnetic heads H1, H2, --- Hn and Hc that record signals on the recording tracks T1, T2, --- Tn and control signals on the tracking control track Tc, while reproducing heads C1, C2 --- Cn and Cc are in position opposite those recording heads. In addition, a pair of reproducing heads, A and B, are provided for the recording head Hc that records signals on track Hc to enable these heads A and B to follow up the control track Tc by covering the width of the recording head Hc. While following track Tc, the reproducing heads A and B output detect signals Ap and Bp respectively. The relationship between these outputs Ap and Bp against the difference Ap−Bp is shown in FIG. 2. When these reproducing heads A and B are in the positive direction, output Ap from reproducing head A remains constant, whereas output Bp from reproducing head B decreases, and as a result, the difference of outputs Ap−Bp between reproducing heads A and B increases. Conversely, when the positions of reproducing heads A and B deviate in the negative direction, output Ap from the reproducing head A decreases, whereas output Bp from the reproducing head B remains constant, and thus the difference of outputs Ap−Bp between these heads A and B is led into a negative value. On the other hand, when reproducing heads A and B are in normal positions, i.e., in a central position, the difference of outputs Ap−Bp between reproducing heads A and B becomes zero. Applying such functional characteristics described above, the "dynamic tracking control system" corrects the tracking positions of reproducing heads A and B against tracks T1, T2, --- Tn by using the output differences from these heads as the control signal.

Nevertheless, in addition to the data recording tracks, such a conventional tracking control system still needs to provide a control track for controlling the position of the track reproducing the recorded data signals. And yet, the conventional tracking control system potentially has certain disadvantages described hereafter. When the control signal from the control track is incorrectly transmitted as a result of the dropout of the control signal from the magnetic tape or clogged heads, the reproducing heads cannot be controlled at all. In addition, apart from any such functional problem, even if the positions of the reproducing heads may be corrected by means of control signals delivered from the control track, from the standpoint of functional accuracy, it is technically difficult to correct the height alone i.e., the positions of these heads while maintaining as constant the deviation of the synchronizing signal. In fact, there are definite limits to the achievement of further improvements in the functional accuracy of a conventional tracking control system.

SUMMARY OF THE INVENTION

The present invention aims at providing totally unique multi-track magnetic recording and reproducing apparatus capable of securely promoting the density of the recording tracks and improving reproduction fidelity by causing the reproducing heads to securely track and correct deviations of both the recording and reproducing heads while reproducing the recorded signals even if such deviations are due to excessive density of the recording tracks.

In the light of such a disadvantage inherent in the conventional tracking control system thus described, the present invention is aimed at the satisfactory reproduction of main data and provides a useful method of controlling the tracking operation without adversely being affected by signal dropout on the tape or clogged magnetic heads, while dispensing with a special track for controlling the control-data track by a unique arrangement of tracks on the reproducing magnetic heads.

Other objects and further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will, from the following detailed description, become apparent to those skilled in the art from this detailed description.

The multi-track magnetic recording and reproducing apparatus embodied by the present invention comprises: a data extraction device provided with one or two units of data signal reproduction heads respectively dealing with some of a plurality of recording heads; circuits controlling the tracking operation of the reproducing heads by applying control signals fed from the reproducing heads; and an azimuth control circuit controlling the deviation of synchronizing signals by applying control signals fed from the reproducing heads.

The present invention provides a plurality of preferred embodiments for implementing the control of the tracking operations of the reproducing heads. One of the methods of controlling the tracking operation of the reproducing heads, each containing multi-tracks for dealing with the recorded magnetic tape, divides those tracks into two groups. The first group causes each track of the reproducing heads to deviate in the first direction from the center position of the tracks of the magnetic tape. The second track group causes each track of the reproducing heads to deviate in the second direction, opposite from the first direction. Finally, the tracking control signal is made up using the difference in outputs from the first and second track groups.

Another preferred embodiment provides a method of controlling the tracking operation of the reproducing heads containing multi-tracks for dealing with magnetic tape, where this method provides each of the two units of the reproducing heads covering the width of the tracks for some or all of the recording heads and each dealing with a plurality of tracks, thus allowing each recording head to detect the difference in signal output from those reproducing heads set to such positions opposite to each other so that the tracking operation of the reproducing heads can be correctly controlled in accordance with the detected difference in the output signals.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a typical format of a conventional tracking control system showing the relationship between the recording heads and reproducing heads dealing with the magnetic tape tracks;

FIG. 2 is the relationship between the deviated tracking operation and the output from the reproducing heads;

DETAILED DESCRIPTION OF THE INVENTION

Figure 3:
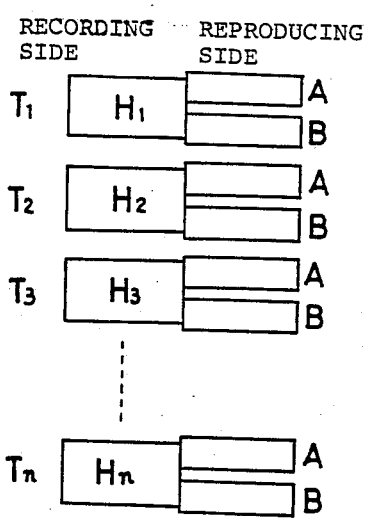
FIG. 3 is a typical format showing the relationship between the recording heads and the reproducing heads dealing with tracks of the magnetic tape, reflecting the first preferred embodiment of the present invention.
Figure 4:
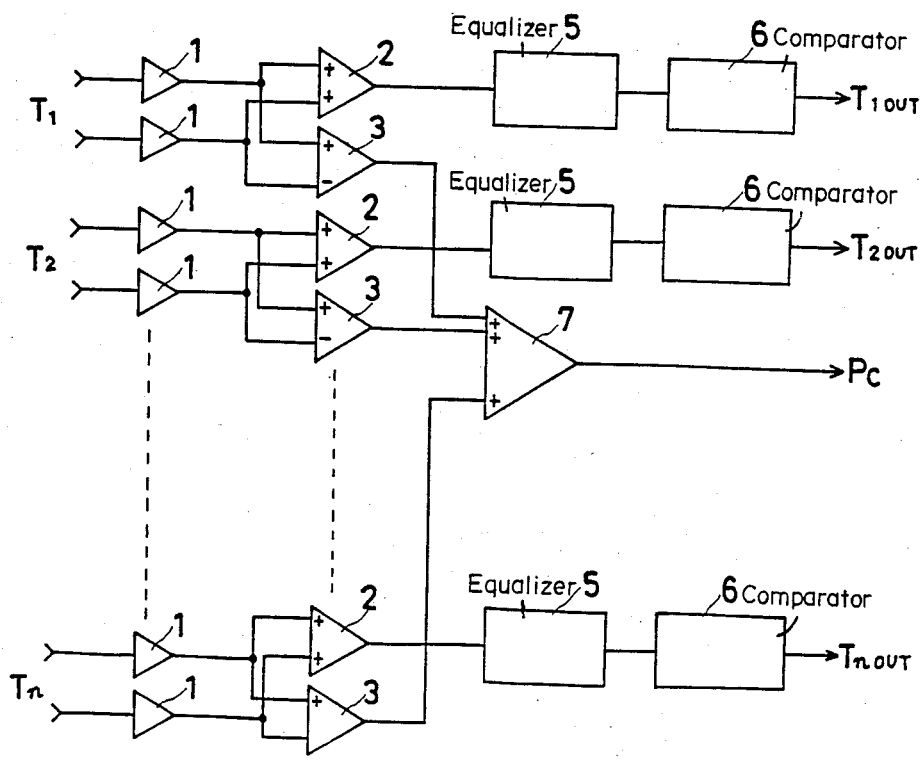
FIGS. 4 and 5 are respectively the block diagrams of circuits that process signals picked up by the reproducing heads.
Figure 5:
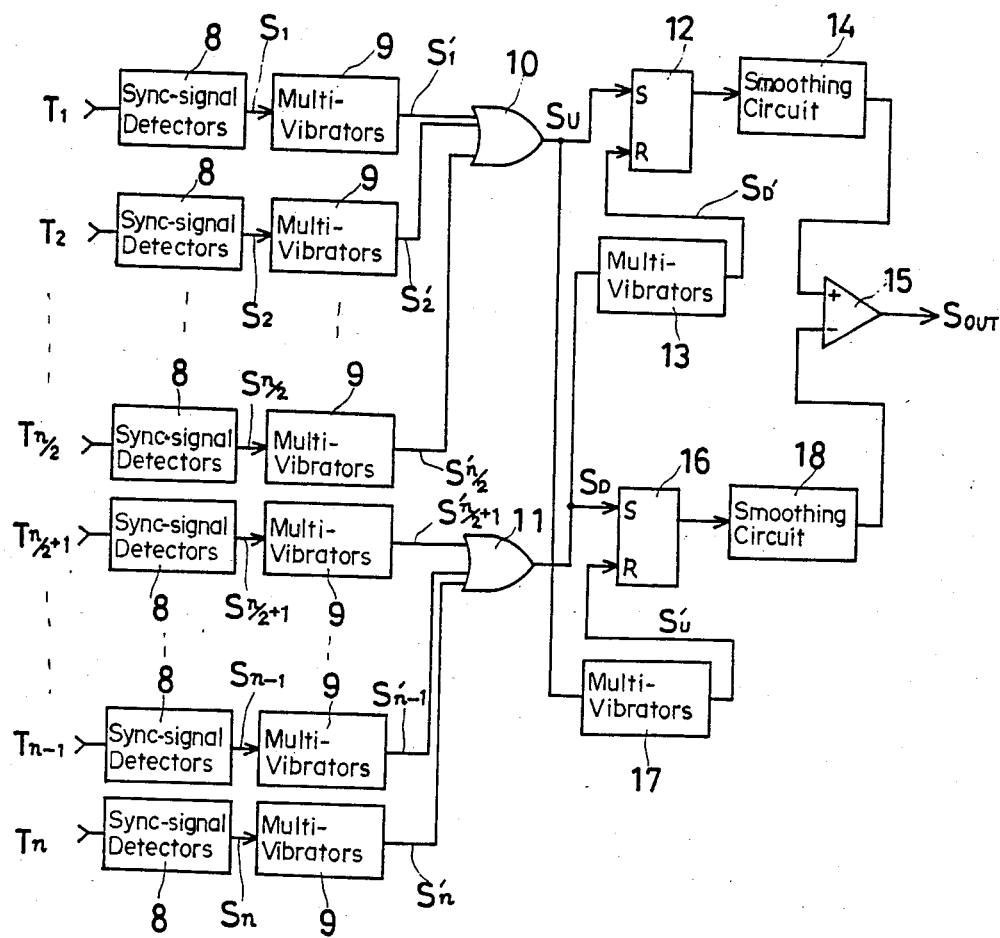

Referring now to the accompanying drawings, the first preferred embodiment of the present invention is described below. First, a pair of reproducing heads A and B are installed in such a way that each head can deal with the recording heads H1, H2 --- Hn that respectively record a variety of signals onto a plurality of recording tracks T1, T2, T3 --- Tn on a magnetic tape. These heads are so arranged that even the slightest deviation of position of recording tracks T1, T2, T3, --- Tn can be correctly taken out from each reproducing head in the form of a pair of output signals indicating the presence of such deviation. Since reproducing heads A and B are respectively set to positions opposite from each other on both sides of the width of the recording tracks by regulating their pitches, even if reproducing heads A and B deviate in any direction, neither of these heads A and B can output deviation signals simultaneously unless the deviation takes place over more than the width of recording tracks T1, T2, --- Tn themselves. This means that only one of the reproducing heads A and B outputs the deviation signal. The relationship between the magnitude of the tracking deviation and the magnitude of the output signal is shown in FIG. 2. Referring to FIG. 4, a deviation signal output from these reproducing head A and B indicating incorrect contact between tracks and the reproducing heads is first amplified by buffer amplifiers 1, 1 --- and these signals are then delivered to adder 2 that sums up the outputs from buffer amplifiers 1, 1 --- and are also sent to adder 3 that computes the difference Ap−Bp shown in FIG. 2. Then, the output difference Ap−Bp detected from tracks T1, T2, T3 --- Tn by adder 3, 3 --- is processed by another adder 7, and finally the processed signal performs the role of control signal Pc to follow up deviation of the position of these reproducing heads A and B against respective tracks. In the next stage, signals output from adders 2, 2 --- are first delivered to equalizers 5, 5 ---and then to comparators 6, 6 --- before eventually being sent out in the form of digital signals T1-out, T2-out, ---Tn-out so that these digital signals T1-out, T2-out, --- Tn-out so that these digital signals can be used for the azimuth control input signals shown in FIG. 5. See FIG. 5, in which digital signals from comparators 6, 6 --- are first delivered to the sync-signal detectors 8, 8 --- and then to one-shot multivibrators 9, 9 --- so that these digital signals can be drawn out as signals S1', S2', ---Sn' for delivery to a pair of OR circuits. Signals S1', S2', --- Sn' are then divided into two blocks for dealing with the upper and lower halves of tracks. As a result, the divided signals S1' --- Sn/2' and Sn/2+1' --- Sn' are then routed to a pair of OR circuits 10 and 11. Signals Su and Sd from OR circuits 10 and 11 are then delivered to RS flip flop circuits 12 and 16 so that these can be activated. At the same time, signals Su an Sd are respectively delivered to one-shot multivibrators 13 and 17 and then to RS flip flop circuits 12 and 16 which are in positions opposite from each other so that both circuits can be activated. Two pulses generated by RS flip flop circuits 12 and 16 are then routed to the smoothing circuits 14 and 18 before eventually being sent out of subtractor 15 as a resultant output signal.

Using reproducing heads A and B that respectively deal with recording heads H1, H2 --- Hn, the multi-track magnetic recording and reproducing apparatus incorporating the first preferred embodiment of the present invention individually draws out data signals from each track and amplifies these using amplifiers 1, 1 ---. The amplified data signals are then processed by adders 3 --- before being delivered to a pair of reproducing heads A and B, and the difference (Ap−Bp) of the output is then drawn out as shown in FIG. 2. These output signals indicating the deviation are eventually added and averaged by adder 7, thus creating the relationship shown in FIG. 2. By processing the output signals via the operations described above, the difference of the reproduced signals from respective tracks can be averaged so that the most reliable deviation amount can be indicated.

Even if any of the reproducing heads are clogged or signal dropout occurs on the tape, since the system is provided with a plurality of reproducing heads, the deviation value will become quite negligible and there will be no adverse effects on the performance reliability of the entire system thus making it possible to effectively use the averaged difference of output signals to control the tracking operations of these reproducing heads.

Figure 6:
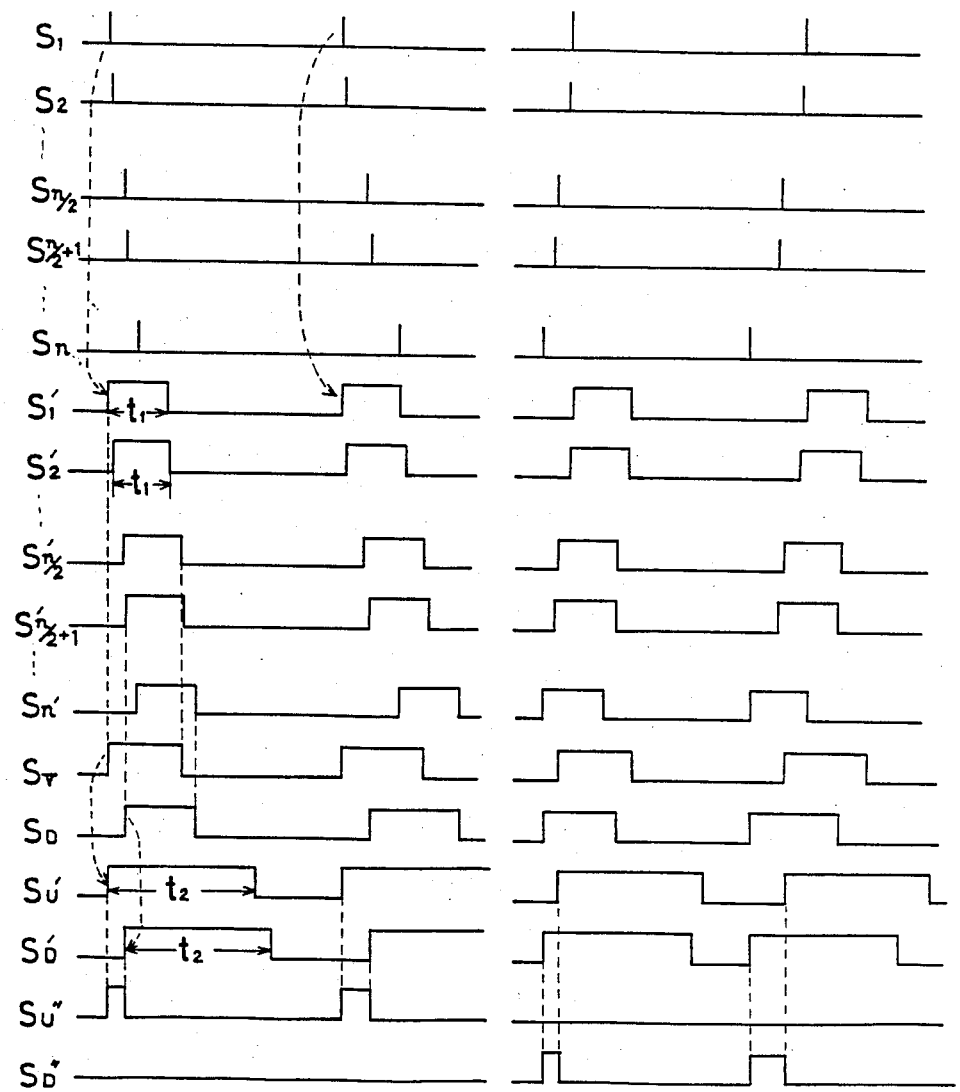
FIGS. 6 and 7 are respectively the signal waveforms generated by operations processed by respective circuits.
Figure 7:
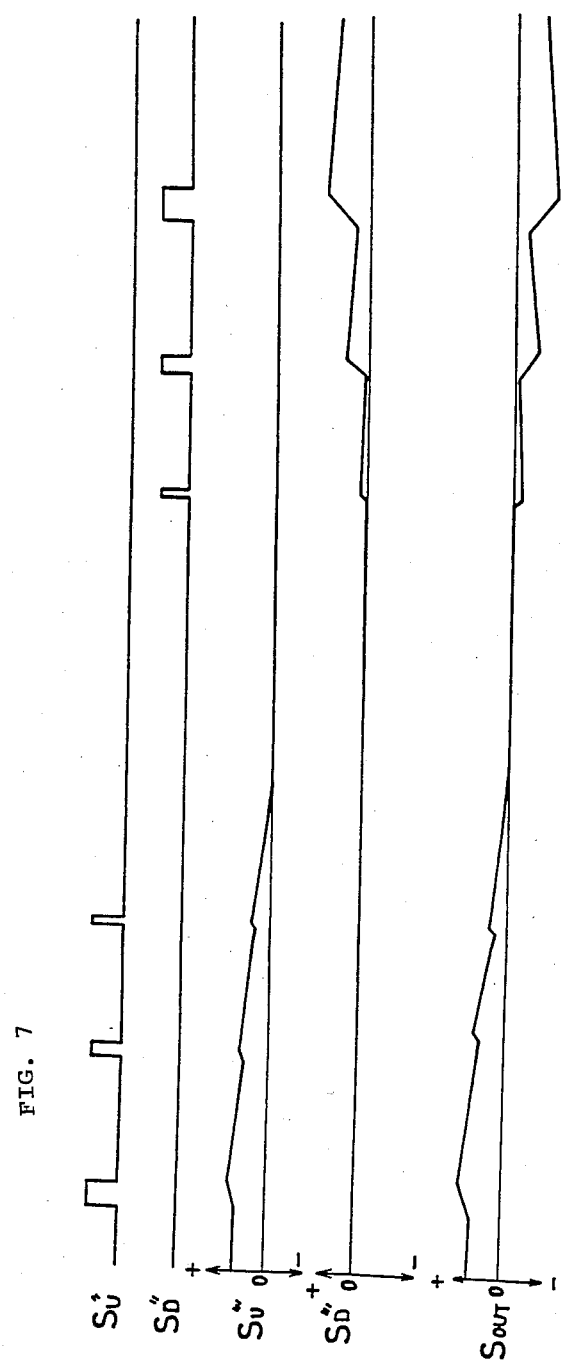

On the other hand, adder 2 outputs the sum of the reproduced signals. This improves the S/N ratio of the demodulated signal components against noise. Output signals are then converted into digital signals by means of waveform equalizer 5 and comparator 6. Then, the ensuing sync-signal detectors 8, 8 --- and the one-shot multivibrators 9, 9 --- convert these signals to facilitate reading them. Sync signals (S1, S2 --- Sn shown in FIG. 6) extracted from the sync-signal detectors 8, 8 --- are converted into pulses S1', S2' --- Sn' each having the identical time width t1 when those signals are processed by one-shot multivibrators 9, 9 ---. Such a conversion prevents the generation of an excessive number of pulses caused by the addition of such sync signals S1, S2 --- S2. This provides each pulse with a specific width so that, by means of addition, pulses can be integrated into one pulse.

Pulse signals S1', S2' --- Sn' each having a specific time width, t1, fully deal with tracks T1, T2, --- Tn by being divided into two pulse groups; one for dealing with the upper half tracks and the other for the lower half tracks, respectively. By adding these pulses together via a pair of OR circuits 10 and 11, two pulse signals Su and Sd are generated. In other words, deviation of the sync signals both in the upper and lower halves of the tracks is substituted by the width of two pulse signals, while the sync signals in the upper and lower halves of the tracks are extracted as the deviated components of pulses. Those two pulses Su and Sd are respectively delivered to RS flip flop circuits 12 and 16. In addition, one-shot multi-vibrators 17 and 13, each having the time constant t2 that functions on receipt of pulses Su and Sd, then respectively output pulses Su' and Sd' to RS flip flop circuits 16 and 12. As a result, pulses Su' and Sd' are converted into pulses Su" and Sd" each having the time constant T2. This allows either of pulses Su and Sd, whichever is the more advanced, to fully mask the delayed one within a specific time t2. For example, when the sync signal S1 is in advance of the sync signal Sn, RS flip flop circuits 12 and 16 output pulse Su" having a width proportional to the difference between sync signals S1 and Sn, and, as a result, pulse Sd" is erased and becomes "zero" signal (see the left-side of FIG. 6). Conversely, when the sync signal Sn is in advance of sync signal S1, pulse Sd" appears as a signal having a width proportional to the difference between both sync signals, and thus pulse signal Su" becomes "zero" signal (see the right-side of FIG. 6). Since priority is given to pulses Su' and Sd' delivered to reset terminals R of RS flip flop circuits 12 and 16, if pulses Sd and Su are delivered to these reset terminals in advance, these pulses having a width matching the advanced time are respectively output from RS flip flop circuits 12 and 16 as output signals Su" and Sd'. These signals Su" and Sd" from RS flip flop circuits 12 and 16 are first routed to smoothing circuits 14 and 18 which respectively deliver a specific DC voltage containing signal components Su" and Sd", and these signals Su" and Sd" are finally sent out of subtractor 15 as the data So-out containing the synchronized deviation amount and the directional amount. This enables the system to use this data signal So-out for controlling the synchronized deviation (i.e., for controlling azimuth) of the reproducing heads.

As is clear from the foregoing description, the first embodiment of the present invention eliminates the need for independent control heads, and, as a result, a plurality of reproducing heads can be installed in this space which would be otherwise needed for the installation of control heads, thus securely promoting multiplication of the entire system. In addition, even if the present system reflecting the first embodiment does not require a high-precision performance mechanism, it still provides high-density multiple heads and dispenses with the need for significantly improving tape-run performance characteristics. In particular, the first embodiment of the present invention features imcomparable advantages, in which the entire system can be operated without adversely being affected by the occurrence of clogged heads or signal dropout from the tape. In addition, due to the provision of an increased multiplicity of magnetic heads, accuracy in signal detection has been sharply improved, while the design structure and moderate size provide much convenience when handling a system incorporating the first embodiment of the present invention.

Figure 8:
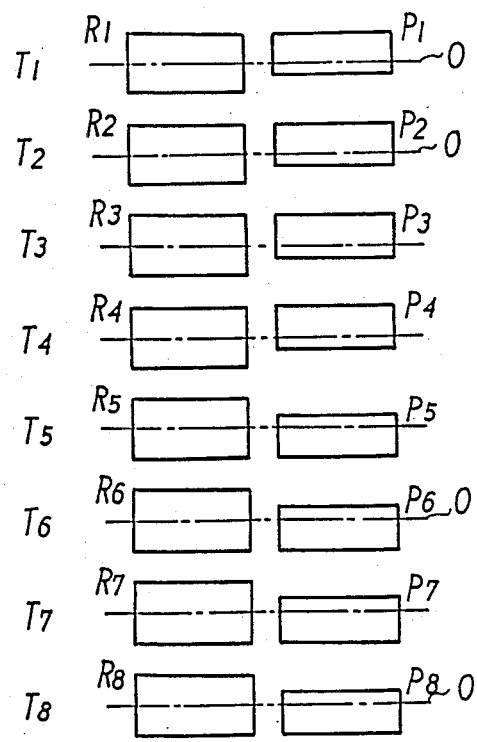
FIG. 8 is a typical format of the tracking operation performed by a multi-track magnetic head according to a tracking control system reflecting the second preferred embodiment of the present invention.
Figure 9:
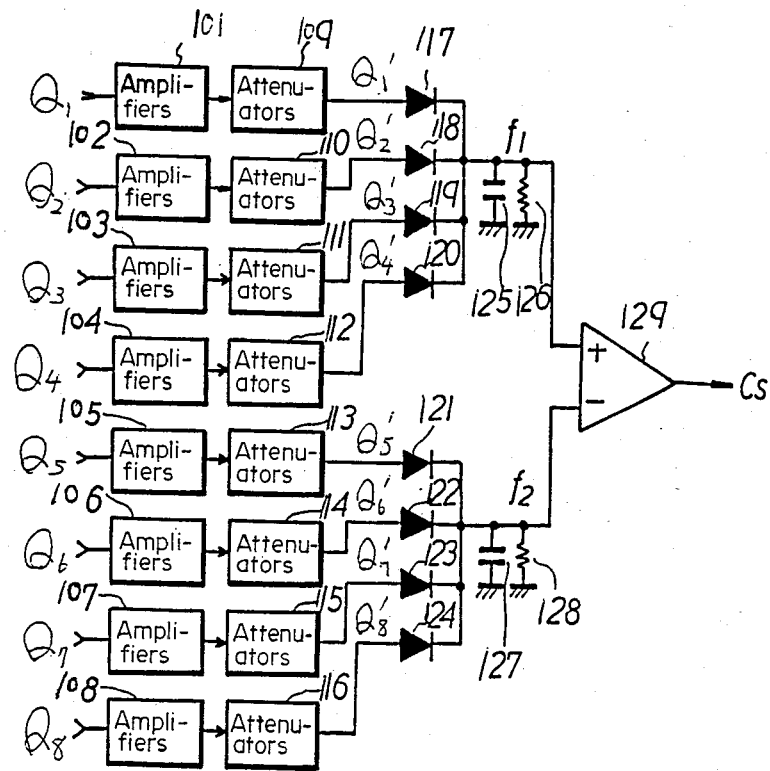
FIG. 9 is a simplified block diagram of the control signal generator circuit applied to the tracking control system embodied by the present invention.
Figure 10:
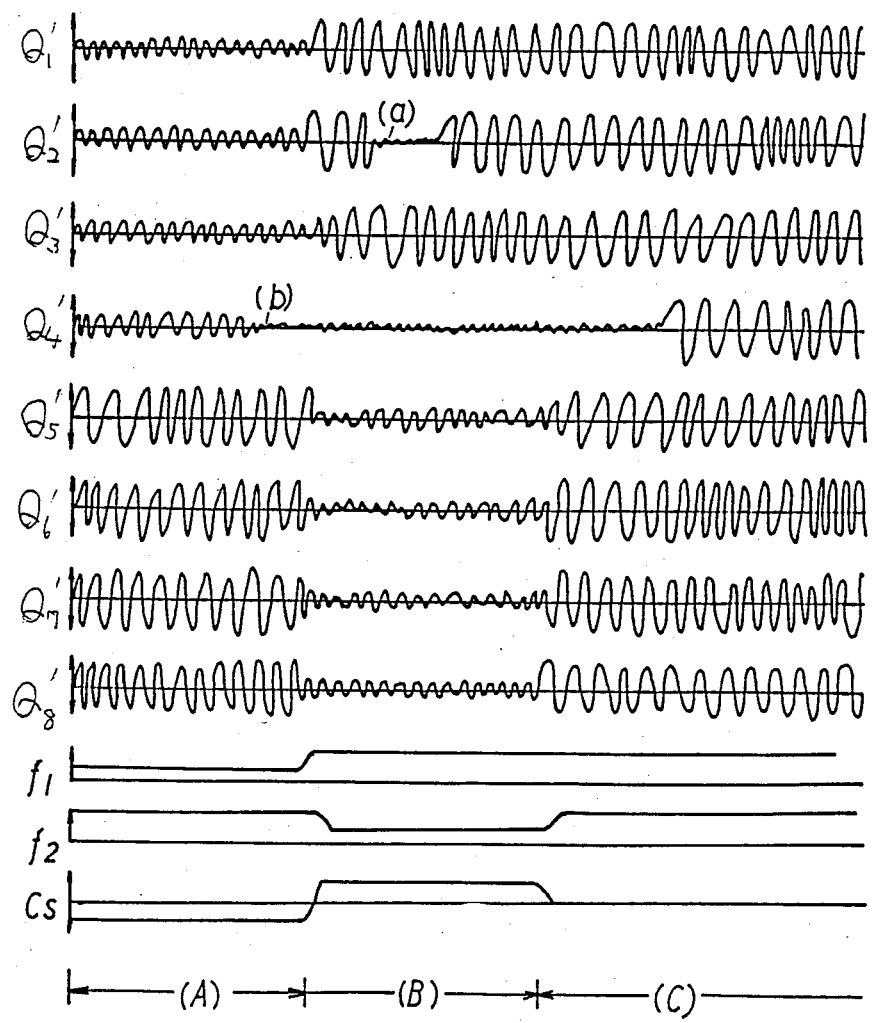
FIG. 10 is the signal waveform output from the tracking control system reflecting the second preferred embodiment of the present invention.

Referring now to FIGS. 8 through 10 of the accompanying drawings, the second preferred embodiment of the present invention is described below. In the second embodiment, for explanatory purposes, the total number of tracks T1 through Tn of the magnetic tape is provisionally set at 8 (n=8).

It should be noted, however, that "n" is by no means defined as 8 in any of the preferred embodiments of the present invention. The second preferred embodiment specifically describes the control signal generator circuit that generates the tracking control signals. FIG. 8 shows the typical format of the tracks of both the recording and reproducing magnetic heads when the total number of tracks T1 through Tn of the magnetic tape is provisionally set to 8, reflecting the second preferred embodiment of the present invention. Reference numbers R1 through R8 shown to the left respectively indicate the tracks of the recording magnetic heads, whereas reference numbers P1 through P8 shown to the right respectively indicate the tracks of the reproducing heads. The above tracking format deserves attention because tracks R1 through R8 of the recording magnetic heads are aligned with the center position 0 of the tracks of the magnetic tape, whereas, the positions of all the tracks of the reproducing heads, tracks P1 through P4 dealing with tracks T1 through T4 of the magnetic tape respectively deviate above the center position 0, and conversely, the position of the reproducing leads P5 through P8 dealing with tracks T5 through T8 of the magnetic tape respectively deviate below the center position 0.

FIG. 9 shows a simplified block diagram of the control signal generator circuit generating tracking control signals from the outputs of the reproducing magnetic heads featuring the tracking arrangement described above. Reference numbers 101 through 108 respectively indicate amplifier circuits amplifying the incoming reproducing signals Q1 through Q8 from tracks P1 through P8 of the reproducing magnetic heads. Reference numbers 109 through 116 respectively indicate attenuators adjusting uneven levels of output signals Q1 through Q8 fed from amplifier circuits 101 through 108. Reference numbers 117 through 124 respectively indicate diodes detecting the signal waveforms output from attenuators 109 through 116. Of these, output signals from diodes 117 through 120 are first smoothed by common capacitor 125, which are then converted into the first signal "f1" before being delivered to the anode of differential amplifier 129. Output signals from diode 121 through 124 are first smoothed by common capacitor 127, and then converted into the second signal "f2" before being delivered to the cathode of differential amplifier 129. Differential amplifier 129 then processes the first and second signals "f1" and "f2" before outputting the tracking control signal Cs. Reference numbers 126 and 128 are respectively such elements detecting the time constants when capacitors 125 and 127 respectively perform discharge operations, providing sufficient time constants. Using these circuits, when reproducing main data signals recorded on the magnetic tape via tracks P1 through P8 of the reproducing magnetic heads, signals Q1 and Q2 output from these tracks are first amplified by amplifiers 101 through 108, and then delivered to attenuators 109 through 116 for regulating uneven signal components, and finally, the level-regulated signals Q1' through Q8' are sent out (see the waveforms shown in FIG. 10). Of these, signals Q1 through Q4 from attenuators 109 through 112 are first delivered to diodes 117 through 120, which then detect the waveforms of these signals. After these signals are added together, they are smoothed by common capacitor 125, and finally, the smoothed signals are converted into the first signal "f1", which is then delivered to the anode of differential amplifier 129. Signals Q'5 through Q'8 from attenuators 113 through 116 are delivered to diodes 121 through 124, which then detect the waveforms of these signals. After these signals are added together, they are smoothed by common capacitor 127, and finally, the smoothed signals are converted into the second signal "f2", which is then delivered to the cathode of differential amplifier 129. The first and second signals "f1" and "f2" are respectively processed by differential amplifier 129, which then generates the control signal Cs eventually.

The waveform chart shown in FIG. 10 indicates, in conjunction with FIG. 8, that the reproducing magnetic heads deviate their positions above the center position 0 of the tracks of the magnetic tape during period (A) of the control signal Cs, and, as a result, tracks P5 through P8 respectively generate such outputs greater than those of tracks P1 through P4, whereas the reproducing heads deviate their positions below the center position 0 of the tracks of the magnetic tape during period (B) of the control signal Cs, and, as a result, tracks P1 through P4 respectively generate such outputs greater than those of the tracks P5 through P8. On the other hand, tracks P1 through P4 and P5 through P8 respectively generate equivalent outputs during period (C) of the control signal Cs. Accordingly, using the performance characteristics described above, when the control signal Cs is transmitted to the tracking servo system (not shown) of the reproducing magnetic heads, the tracking servo system functions to lower the positions of the reproducing magnetic heads during period (A) of the control signal Cs and raises the positions of these heads during period (B), whereas it functions so that the reproducing magnetic heads can remain with their positions unchanged during period (C) of the control signal Cs. FIG. 10 also indicates that signals have partly dropped off from points (a) and (b) of the magnetic tape. Nevertheless, the first signal "f1" still remains unaffected by such a dropout.

This is because diodes 117 through 120 first detect the waveforms of signals Q1' through Q4' sent from attenuators 109 through 112 and then add and average these signals before eventually generating signal "f1".

As is clear from the above description, the second preferred embodiment of the present invention divides multiple tracks of the reproducing magnetic heads into two groups, i.e., the first track group that causes these tracks to deviate their positions in a first direction apart from the center position of the magnetic tape, and the second track group that causes these tracks to deviate their positions in a direction, opposite from the first direction.

Since the second preferred embodiment generates the tracking control signal by effectively applying the difference in output signals from the first and second track groups, the tracking control system embodied by the present invention eliminates the need for providing magnetic heads with independent tracking-control tracks which are needed for any of the conventional tracking control systems used today.

As a result, the preferred embodiments of the present invention can use the multitracks of magnetic heads for securely recording main data signals such as audio signals for example, and yet, the system embodied by the present invention is extremely advantageous in that it is capable of effectively controlling all the tracking operations without adversely being affected by signal dropout from the recorded magnetic tape.

The invention being as thus described, it will be obvious that the same may be varied in many ways. Such variations are not to be regarded as a departure from the spirit and scope of the invention, while all such modifications are intended to be included within the scope of the following claims.

What is claimed is:

1. Multi-track magnetic recording and reproducing apparatus that records and reproduces data signals onto and from a plurality of tracks, comprising:
   recording means for recording data signals, said recording means including a plurality of recording magnetic heads;
   reproducing means for reproducing data signals recorded on the plurality of tracks, said reproducing means including a pair of reproducing magnetic heads covering the width of and corresponding to each of said plurality of recording magnetic heads;

detector means for detecting a difference in output of each of said pairs of reproducing magnetic heads that correspond with each of said plurality of recording magnetic heads and producing a difference signal that is representative of a sum of said difference in output of each of said pairs of reproducing heads;

means for detecting a sum signal for each pair of said reproducing magnetic heads, each sum signal being a sum of the outputs of a corresponding pair of reproducing magnetic heads;

control means for controlling tracking operations of said reproducing magnetic heads in response to said sum of said difference in output;

means for detecting a deviation time of synchronizing signals in response to the sum signals produced by said pairs of reproducing magnetic heads, said synchronizing signals providing synchronous operation of said plurality of recording magnetic heads, and said means for detecting also reproducing a deviation control signal corresponding to said deviation time; and means for controlling the deviation of the synchronizing signals from said reproducing magnetic heads in response to said deviation control signal.

2. Multi-track magnetic recording and reproducing apparatus that records and reproduces data signals onto and from a plurality of data tracks, comprising:

a plurality of recording magnetic heads that record the data signals onto the plurality of data tracks, each of said recording heads being associated with one of said plurality of data tracks;

a reproducing head associated with each of said recording magnetic heads, and each of said data tracks, said reproducing heads being divided into a first data track group, in which said reproducing heads of this first group deviate their positions in a first direction from a center position of the tracks of the magnetic tape, and a second data track group, in which said reproducing heads of this second group deviate from said center position in a second direction which is opposite from said first direction;

detector means for detecting differences in output of said reproducing heads belonging to said first and said second track groups and producing a difference signal that is indicative of said differences in output; and control means for controlling tracking operations of all of said reproducing heads in response to said difference signal.

3. An apparatus for multi-track recording and magnetic reproducing of data signals in conjunction with a recording medium, the medium having a plurality of data tracks, comprising:

recording means for magnetically recording the data signals on the medium, said recording means including a plurality of recording magnetic heads each of said plurality of recording heads corresponding to a data track of the medium;

reproducing means for magnetically reproducing data signals that are recorded on the medium, said reproducing means including a plurality of reproducing magnetic heads, one pair of reproducing magnetic heads corresponding to each recording magnetic head with each of said plurality of reproducing heads being capable of producing an output signal;

means for producing a plurality of difference signals, each difference signal being indicative of a difference between the output signals produced by a particular pair of said reproducing magnetic heads that correspond to a particular one of said plurality of recording magnetic heads;

tracking means, responsive to said plurality of difference signals, for controlling a tracking of the recording medium by said plurality of reproducing magnetic heads, said tracking means including an adding means for adding said plurality of difference signals;

means for producing a plurality of sum signals, each sum signal being indicative of a sum of the output signals produced by a particular pair of said reproducing magnetic heads that correspond to a particular one of said plurality of recording magnetic heads; and azimuth control means, responsive to said plurality of sum signals, for controlling a deviation of synchronizing signals, said synchronizing signals providing synchronous operation of said plurality of recording magnetic heads.

4. The apparatus of claim 3 wherein said azimuth control means includes, first pulse producing means, responsive to a first group of sum signals, said first group including one-half of said plurality of sum signals that are produced, for producing an upper pulse, second pulse producing means responsive to a second group of sum signals, said second group including the one-half of said plurality of sum signals that are not included in said first group, for producing a lower pulse, and means for producing an azimuth control signal from said upper pulse and said lower pulse, said azimuth control signal being indicative of an amount of deviation of said synchronizing signals.

* * * * *